Jan. 28, 1969  F. BUDRECK  3,424,517
TWIN REAR VISION MIRROR ASSEMBLY
Filed Dec. 8, 1965
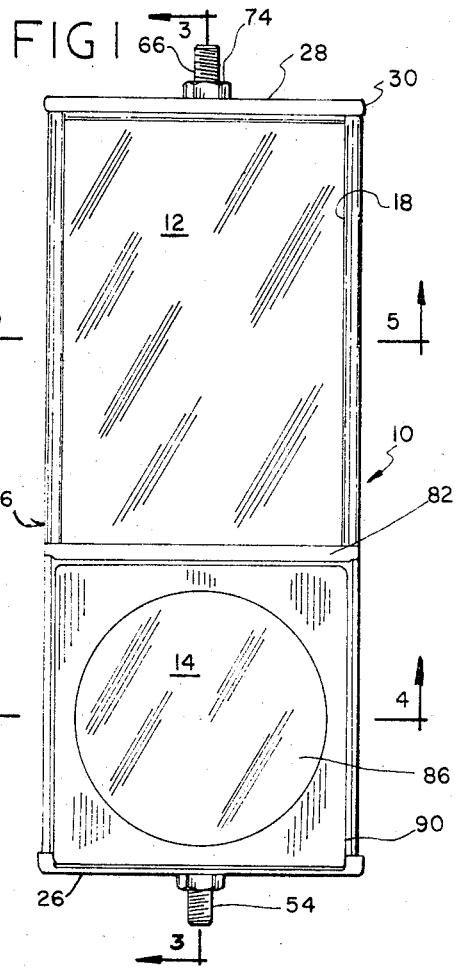
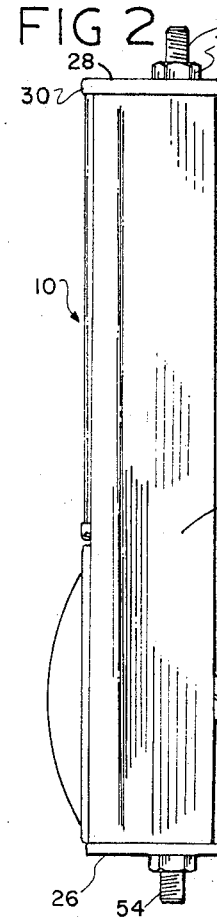
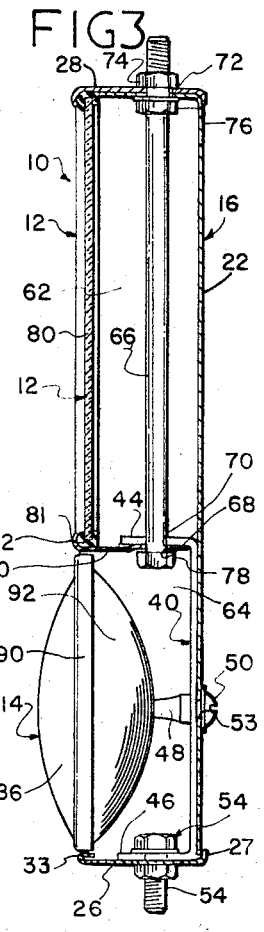
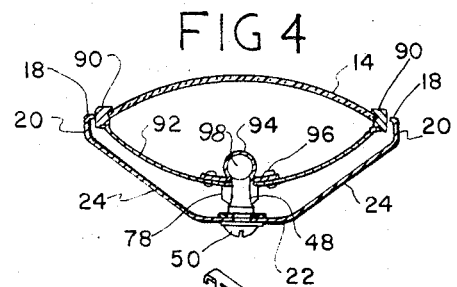
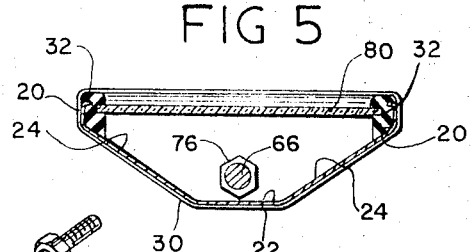
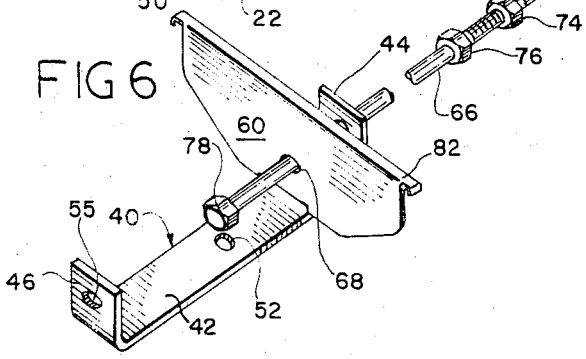
INVENTOR
FRANCES BUDRECK
BY *Norman Peslar*
ATT'Y

United States Patent Office 3,424,517
Patented Jan. 28, 1969

3,424,517
TWIN REAR VISION MIRROR ASSEMBLY
Frances Budreck, Chicago, Ill., assignor to Monarch Tool
& Machinery Co., Chicago, Ill., a corporation of
Illinois
Filed Dec. 8, 1965, Ser. No. 512,443
U.S. Cl. 350—293  1 Claim
Int. Cl. G02b 17/00

ABSTRACT OF THE DISCLOSURE

A rear vision mirror designed especially for trucks and including a planar direct rear view mirror proper and a wide angle viewing mirror proper of frusto-spherical design. A novel anchor strap within the mirror housing affords a reinforcement for the back wall of the housing and also relieves such back wall from having to bear the entire weight of the frusto-spherical mirror which is adjustably mounted on the anchor strap.

---

The improved twin rear vision mirror assembly comprising the present invention is designed for use primarily in connection with an automotive truck, a tractor-trailer combination, or a similar automotive vehicle of large size and great length. The invention is, however, not limited to such use and a mirror assembly embodying the principles of the present invention may, if desired and with or without modification as required, be employed in connection with a passenger automotive vehicle regardless of its size or length. Irrespective, however, of the particular use to which the present invention may be put, the essential features of the invention are at all times preserved.

It is among the principal objects of the present invention to provide a novel twin rear vision mirror assembly embodying two separate mirror units, one of which may effectively be employed for intermediate and far rear vision viewing and the other of which may effectively be employed for adjacent side and proximate rear vision viewing, the two mirror units giving the driver of the vehicle a substantially full field of vision at all times regardless of whether he be pursuing a straight course or turning the vehicle. Heretofore, a rear vision mirror assembly employing a single mirror unit has required the driver of the vehicle to effect a compromise between far rear vision viewing and adjacent side vision viewing, as, for example, viewing in an adjacent lane when being overtaken by a following vehicle. The present invention overcomes the above-noted limitation that is attendant upon the use of single unit rear vision mirror assembly and, accordingly, there is contemplated the provision of a twin rear vision mirror assembly including a relatively large, rectangular, vertically elongated, upper mirror unit and a smaller, frusto-spherical, lower mirror unit, the two units being mounted within the confines of a common rectangular, vertically elongated housing. The large upper mirror unit is planar and is fixedly disposed within the housing so as to be adjustable bodily by way of the usual frame mounting. The small lower mirror unit is of convex or frusto-spherical configuration and is independently adjustable within the frame. This latter mirror unit serves to accommodate wide-angle side viewing and because of its frusto-spherical configuration, minor adjustments of the housing as a whole will effect upper mirror unit adjustments but will not appreciably disturb the optical or viewing effect of the lower mirror unit. Provision for adjustment of the small lower mirror unit is made principally to accommodate an initial installation of the mirror assembly on a vehicle at a predetermined side spacing of the assembly from the vehicle. Once this initial adjustment of the small lower mirror unit has been made, for all intents and the purposes, the adjustment may remain a permanent one.

The present invention is primarily concerned with a novel mounting whereby the two mirror units are substantially completely disposed within the confines of the common mirror unit housing, such mirror units being effectively held in their respective positions within the housing by the novel mounting means which not only serves as a mounting means for the two units, but also affords a trunnion support for the housing as a whole whereby the latter may effectively be carried in an adjustable manner in an adjustable U-frame or bracket such as is commonly employed as the main frame support for a conventional rear vision mirror assembly.

The provision of a twin rear vision assembly such as has briefly been outlined above and possessing the stated advantages constituting the principal object of the present invention, it is a further object to provide in connection with such an assembly a novel mirror unit mounting which is devoid of sheet metal screws and relies for its mirror unit support upon a single bracket and a cooperating partition member, the two parts serving as a common support for both mirror units and also serving as reinforcing members for the relatively light common mirror unit housing. Two nut and bolt assemblies are all that is required for holding the parts in position and the shank portions of the bolts of these two assemblies function as trunnions in the over-all assembly whereby the same may be adjustably carried in a U-frame or the like which is attached to the associated automotive vehicle.

The provision of a twin rear vision mirror assembly which is extremely simple in its construction and, therefore, requires no complicated assembly procedure; one in which the component parts thereof are in the form of sheet metal stampings and, therefore, may be manufactured at a low cost; one which is rugged and durable and, therefore, will withstand rough usage; and one which is attractive in its appearance and pleasing in its design, are further desirable features which have been borne in mind in the production and development of the present invention.

Other objects and advantages of the invention, not at this time numerated, will readily suggest themselves as the nature of the invention is better understood.

In the accompanying single sheet of drawings forming a part of this specification, one illustrative embodiment of the invention is shown or illustrated.

In these drawings:

FIG. 1 is a plan view of a twin rear vision mirror assembly embodying the principles of the present invention;

FIG. 2 is a side elevational view of the assembly of FIG. 1;

FIG. 3 is a vertical sectional view taken on the line 3—3 of FIG. 1;

FIG. 4 is a horizontal sectional view taken on the line 4—4 of FIG. 1;

FIG. 5 is a horizontal sectional view taken on the line 5—5 of FIG. 1; and

FIG. 6 is an exploded perspective view of certain internal framework mounting structure that is employed in connection with the invention.

Referring now to the drawings in detail, a twin rear vision mirror assembly embodying the present invention is designated in its entirety by the reference numeral 10 and involves in its general organization a fixed upper mirror unit 12 and an adjustable lower mirror unit 14, the two units being encased in a common mirror unit housing 16. The housing 16 is comprised of a trough-like sheet metal shell having an open rectangular front rim 18, narrow side walls 20 (see FIGS. 4 and 5), a back wall 22, inclined interconnecting wall portions 24 and open ends. A removable end wall 26 having a continuous rim flange 27 closes the lower end of the shell and a similar removable end wall 28 having a rim flange 30 closes the upper end of the shell. The side walls 20 are formed with narrow inturned flanges 32 (see FIG. 5). The front portions of the rim flange 27 of the end wall 26 is folded inwardly against the body of the end wall 26 as indicated at 33 for clearance purposes in connection with the mirror unit 14, as will be described presently.

A rigid anchor strap 40 (see FIGS. 3, 4 and 6) is clamped to the back wall 22 of the housing 16 and includes an elongated, vertically extending, narrow, base portion 42, an upper laterally turned end flange 44 and a lower laterally turned end flange 46. The base portion 42 lies flush against the back wall 22 and serves to reinforce the latter by rigidifying the lower region thereof for mirror-supporting purposes as will be described presently. Such strap is held in position on the back wall 22 of the housing 16 by means of a supporting post 48 which threadedly receives in the rear end thereof a clamping bolt 50. The shank portion of such bolt passes through a hole 52 in the base portion 42 of the strap 40 and a registering hole 53 in the back wall 22, the bolt head serving to clamp the two parts together and against the post 48. The lower flange 46 extends along the upper or inside surface of the end wall 26 and the latter is secured in position against this flange by a bolt and nut assembly 54, the shank portion of the bolt projecting outwardly through a hole 55 in the flange 46 and serving as a trunnion support for the mirror assembly as a whole.

The upper flange 44 of the anchor strap 40 projects forwardly of the housing 16 near the central region thereof and has clamped thereto a transverse partition member 60 (see FIGS. 3 and 6) which has an outline conformable to the cross-sectional shape of the housing 16 and divides the latter into upper and lower compartments 62 and 64. An elongated, vertically extending bolt 66 extends through a hole 68 in the partition member 60 and through a hole 70 in the upper flange 44, extends completely across the upper compartment 62, and projects outwardly through a hole 72 in the removable end wall 28. A clamping nut 74 serves to force the end wall 28 against a backing nut 76 as best seen in FIG. 3, and also to draw the head 78 of the bolt 66 against the partition member 60.

The fixed upper mirror unit 12 includes a planar rectangular mirror proper 80 which is encased in a sectional marginal gasket 81 of a suitable elastomeric material, such, for example, as rubber. The assembly which comprises the unit is installed in the rectangular rim opening that is afforded or defined by the two side walls 20, the end wall 28, and the partition member 60. The side sections of the gasket 81 are penetrated by the upper and intermediate portions of the inturned flanges 32 of the side walls 20 and the rear portions of the gasket side sections bear against the adjacent marginal regions of the inclined interconnecting wall portions 24 of the housing 16. The upper section of the gasket 81 underlies and is concealed by the rim flange 30 and the lower section of the gasket underlies and is concealed by a laterally turned flange 82 (see FIG. 6) on the front edge portion of the partition member 60. The side sections of the gasket 81 and the flange 82, as well as the portion of the rim flange 30 which overlies the gasket, cooperate to maintain a visible bezel continuity around the rectangular periphery of the mirror proper 80.

From the above description, it will be seen that when the nuts 74 and 76 are adjusted so that an appreciable degree of tension is maintained in the elongated bolt 66, the mirror unit 12 and the gasket 80 will be wedged securely in position within the rectangular rim opening that is provided for it by the various rim flange sections. At the same time, the removable end wall 28 will be drawn securely into position against the open upper end of the housing 16.

The adjustable lower mirror unit 14 is a sealed unit and includes a convex or frusto-spherical mirror proper 86 of circular outline. Such mirror proper is seated within a rectangular marginal frame 90 which is secured to the rim of a dish-shaped backing member 92. The latter carries on the central portion a socket insert 94 which is riveted in place as at 96. The socket insert 94 constitutes one element of a frictional ball and socket assembly, the other element of such assembly being the previously mentioned post 48. Such post is provided at the front end thereof with a ball 98 which is frictionally received in the socket insert 94 with a tight frictional fit so that the mirror assembly including the circular convex mirror proper 86 and its backing member 92 is thus mounted for limited universal adjustment within the confines of the open rim that is provided for it by the lower portions of the inturned flanges 32 of the side walls 20, the folded front portion 33 of the rim flange 27 of the end wall 26, and the front edge of the partition member 60.

It is to be noted that an extremely rigid support is provided for the adjustable lower mirror unit 14, the strap 40 providing a base reinforcement for the post 48 which carries the unit 14, as well as providing a longitudinal reinforcement for the lower portion of the back wall 22. The partition member 60 also provides a medial reinforcement for the housing 16, while the elongated bolt 66 affords longitudinal reinforcement for the upper region of the housing 16.

In actual operation, when the mirror assembly 10 is mounted on an automotive vehicle, for example, on the driver's door of a tractor cab, an initial adjustment of the housing 16 for far rear vision viewing may be made by turning the housing 16 about the vertical axis of the two trunnion supports that are afforded by the projecting portions of the shanks of the two bolts which project outwardly of the housing 16. Thereafter, the lower mirror unit 14 may be independently adjusted for side viewing. Once an adjustment of the mirror unit 14 has been made with respect to the housing 16, this adjustment is, for all intents and purposes, a permanent one inasmuch as the mirror proper, being of a frusto-spherical nature and having its point of universal swinging movement close to the vertical axis of rotation of the mirror housing 16, will not change the image that is offered thereby except to a minor degree.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claim is the same to be limited.

Having thus described the invention what I claim as new and desire to secure by Letters Patent is:

1. A twin rear vision mirror assembly adapted for mounting adjacent to the driver's compartment of an automotive vehicle and comprising: an upper mirror unit and a lower mirror unit, a composite housing within which said mirror units are encased for front viewing and in superimposed relationship, said upper mirror unit being comprised of a vertically elongated planar rectangular mirror proper of major vertical dimension and minor horizontal dimension, and a composite sectional elastomeric gasket enclosing the periphery of said mirror proper, said lower mirror unit being comprised of a convex circular frusto-spherical mirror proper of substantially the minor dimension of said planar mirror proper, a planar marginal frame encompassing said frusto-spherical mirror proper and having a circular opening within which the latter mirror proper is secured, and a dish-shaped backing member for said frame and provided with a centrally disposed socket therein, said composite housing including a trough-like sheet metal shell having a planar back wall section, spaced apart parallel narrow front side wall sections, intermediate inclined side wall sections, and open upper and lower ends, end walls closing the upper and lower open ends of said shell and provided with rim flanges which are telescopically received over said shell ends, each of said front side wall sections being formed with an inturned rim flange, a horizontal partition wall dividing said housing into an upper compartment and a lower compartment, said partition wall being provided with an upturned rim flange substantially coplanar with said rim flanges on the shell front side wall sections and with the front portion of the rim flange on said upper end wall, said upper mirror unit being disposed within the confines of said upper compartment with the gasket thereof underlying the rim flange on the upper end wall and the rim flange on said partition wall and bearing against the front regions of said intermediate inclined side walls, said lower mirror unit being disposed within the confines of said lower compartment with said planar marginal frame lying substantially in the plane of the rim flanges and with a small clearance from the rim flanges on the front side walls, the partition wall and the lower end wall, a vertically extending anchor strap disposed within said lower compartment, bearing against said narrow planar back wall section in reinforcing and rigidifying relationship, and having upper and lower laterally turned end flanges thereon, the upper flange bearing against said partition wall and the lower flange bearing against said lower end wall, a post fixedly secured to said anchor strap and having a ball on the distal end thereof, said ball being frictionally received within said socket in the dish-shaped backing member whereby the lower mirror unit is capable of limited universal adjustment, there being a series of vertically aligned holes in said upper end wall, said partition wall and the upper flange of the anchor strap, an elongated bolt passing through said holes, having an enlarged head bearing against said upper flange of the anchor strap and having a threaded distal end region, a nut threadedly received on said end region of the bolt and bearing against said upper end wall and serving to draw the latter onto the upper end of the shell, there being a pair of vertically aligned holes in the lower flange of the anchor strap and said lower end wall, and a relatively short bolt passing through said latter pair of holes and having a threaded distal end, and a nut on said latter threaded distal end bearing against said lower end wall and serving to draw the same onto the lower end of the shell, the distal ends of said elongated bolt and of said relatively short bolt projecting outwardly of the housing beyond the adjacent end walls an appreciable distance and constituting trunnion supports for the mirror assembly as a whole.

References Cited

UNITED STATES PATENTS

| | | | |
|---|---|---|---|
| 2,751,817 | 6/1956 | Lapekas | 248—486 |
| 3,146,296 | 8/1964 | Fischer | 350—293 |
| 3,170,985 | 2/1965 | Katulich | 350—293 |

DAVID H. RUBIN, *Primary Examiner.*

U.S. Cl. X.R.

248—484; 350—299